(12) United States Patent
Yelahanka Raghuprasad et al.

(10) Patent No.: US 11,438,240 B2
(45) Date of Patent: Sep. 6, 2022

(54) COMPRESSED TRANSMISSION OF NETWORK DATA FOR NETWORKING MACHINE LEARNING SYSTEMS

(71) Applicant: Cisco Technology, Inc., San Jose, CA (US)

(72) Inventors: Mukund Yelahanka Raghuprasad, Milpitas, CA (US); David Tedaldi, Zurich (CH); Vinay Kumar Kolar, San Jose, CA (US); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 83 days.

(21) Appl. No.: 16/808,896

(22) Filed: Mar. 4, 2020

(65) Prior Publication Data
US 2021/0281491 A1   Sep. 9, 2021

(51) Int. Cl.
| | |
|---|---|
| *H04L 41/16* | (2022.01) |
| *G06N 3/08* | (2006.01) |
| *H04L 47/2441* | (2022.01) |
| *H04L 41/5019* | (2022.01) |
| *G06K 9/62* | (2022.01) |

(52) U.S. Cl.
CPC ............ *H04L 41/16* (2013.01); *G06K 9/6267* (2013.01); *G06N 3/084* (2013.01); *H04L 41/5019* (2013.01); *H04L 47/2441* (2013.01)

(58) Field of Classification Search
CPC .. H04L 41/16; H04L 41/5019; H04L 41/2441
See application file for complete search history.

(56) References Cited

U.S. PATENT DOCUMENTS

| | | | |
|---|---|---|---|
| 7,930,436 B1 | 4/2011 | Znosko | |
| 9,384,204 B2 | 7/2016 | Gupta | |
| 9,658,776 B2 | 5/2017 | Miura | |
| 2017/0034042 A1* | 2/2017 | Gross | ............... H02J 13/00007 |

(Continued)

OTHER PUBLICATIONS

Eruhimov, et al., "Supervised compression of multivariate time series data", 2006 14th European Signal Processing Conference, Sep. 2006, 5 pages, IEEE.

(Continued)

*Primary Examiner* — Adnan M Mirza
(74) *Attorney, Agent, or Firm* — Behmke Innovation Group LLC; Kenneth J. Heywood; Jonathon P. Western

(57) ABSTRACT

In one embodiment, a service receives telemetry data indicative of a plurality of performance metrics captured in a network. The service jointly trains, using the received telemetry data, a compression model and an inference model, the compression model being a first machine learning model trained to convert the telemetry data into a compressed representation of the telemetry data and the inference model being a second machine learning model trained to take the compressed representation of the telemetry data as input and apply a classification label to it. The service deploys the compression model to the network. The service receives compressed telemetry data generated by the compression model deployed to the network. The service uses the inference model to classify the compressed telemetry data generated by the compression model deployed to the network.

20 Claims, 12 Drawing Sheets

(56) References Cited

U.S. PATENT DOCUMENTS

2020/0410288 A1* 12/2020 Capota ................ G06F 9/5072

OTHER PUBLICATIONS

Martinez, Gerard, "Autoencoders for the compression of stock market time series", online: https://towardsdatascience.com/autoencoders-for-the-compression-of-stock-market-data-28e8c1a2da3e, Jan. 2019, 11 pages.

Shamieh, Fuad, "Advanced Compression and Latency Reduction Techniques Over Data Networks", (2015). Electronic Thesis and Dissertation Repository. 2844, 123 pages, Western University.

Smith, Charles Alexander, "Survey of Various Data Compression Techniques", Int. J. of Recent Technol. Eng, 2(1), (2010), pp. 1-20.

* cited by examiner

# COMPRESSED TRANSMISSION OF NETWORK DATA FOR NETWORKING MACHINE LEARNING SYSTEMS

TECHNICAL FIELD

The present disclosure relates generally to computer networks, and, more particularly, to the compressed transmission of network data for networking machine learning systems.

BACKGROUND

Networks are large-scale distributed systems governed by complex dynamics and very large number of parameters. In general, network assurance involves applying analytics to captured network information, to assess the health of the network. For example, a network assurance service may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

With the recent proliferation of machine learning techniques, new opportunities have arisen with respect to monitoring a network. Indeed, machine learning has proven quite capable of analyzing complex network patterns and identifying problems that might otherwise be missed by a network administrator. In some cases, a machine learning-based network assurance system may even be able to predict problems before they occur, allowing for corrective measures to be taken in advance.

Unfortunately, machine learning systems typically require the collection and reporting of a large amount of time series data. In cloud-based implementations, this means transmitting large amount of time series data from the networking devices/entities to the cloud for input to the machine learning model(s), to drive downstream actions such as predicting SLAs, alerting, etc. Since a large number of devices transmit this data at a very high frequency, the amount of telemetry data can quickly overwhelm the network by consuming valuable network resources.

DESCRIPTION OF EXAMPLE EMBODIMENTS

Overview

Figure 1A:
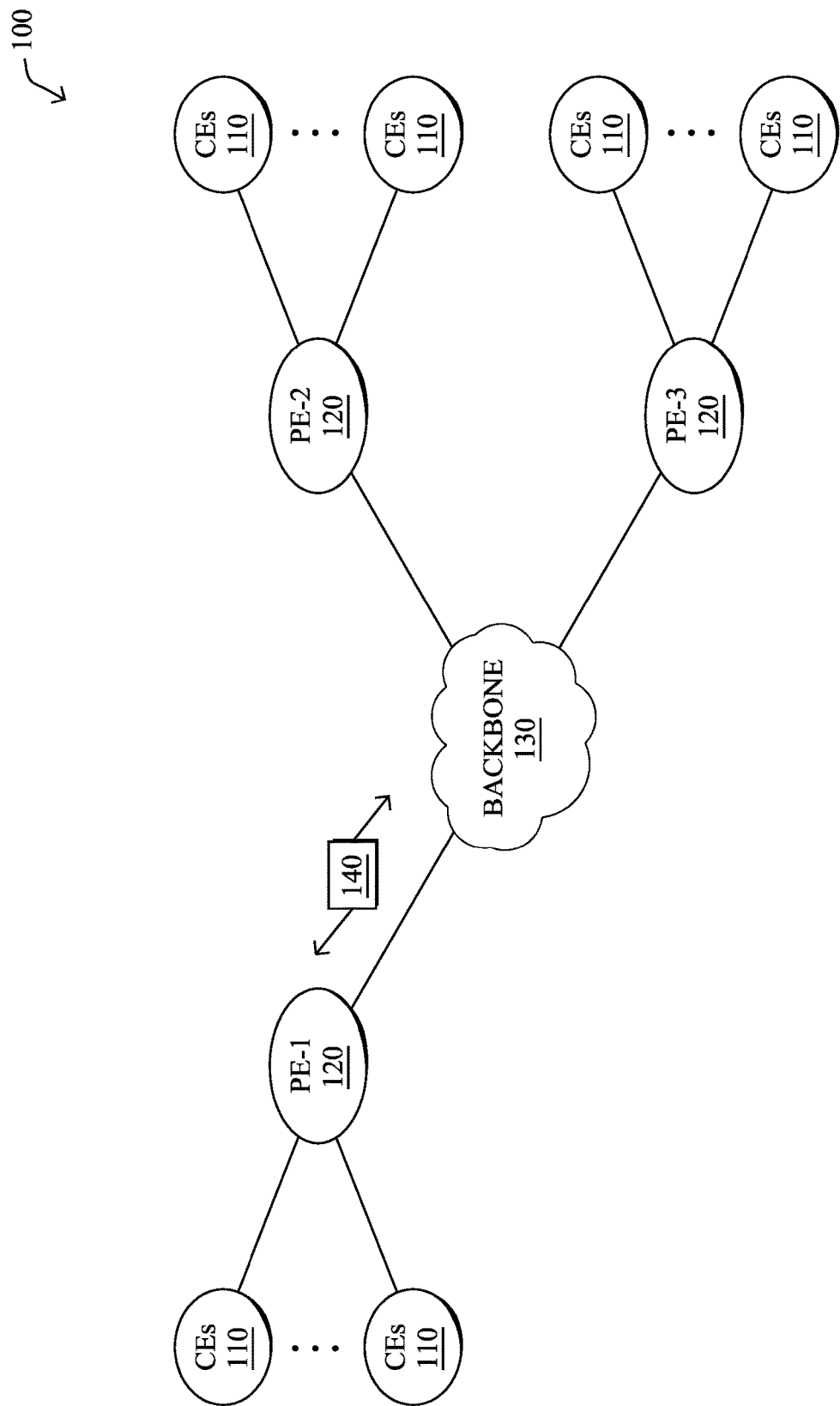
FIGS. 1A-1B illustrate an example communication network.

According to one or more embodiments of the disclosure, a service receives telemetry data indicative of a plurality of performance metrics captured in a network. The service jointly trains, using the received telemetry data, a compression model and an inference model, the compression model being a first machine learning model trained to convert the telemetry data into a compressed representation of the telemetry data and the inference model being a second machine learning model trained to take the compressed representation of the telemetry data as input and apply a classification label to it. The service deploys the compression model to the network. The service receives compressed telemetry data generated by the compression model deployed to the network. The service uses the inference model to classify the compressed telemetry data generated by the compression model deployed to the network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
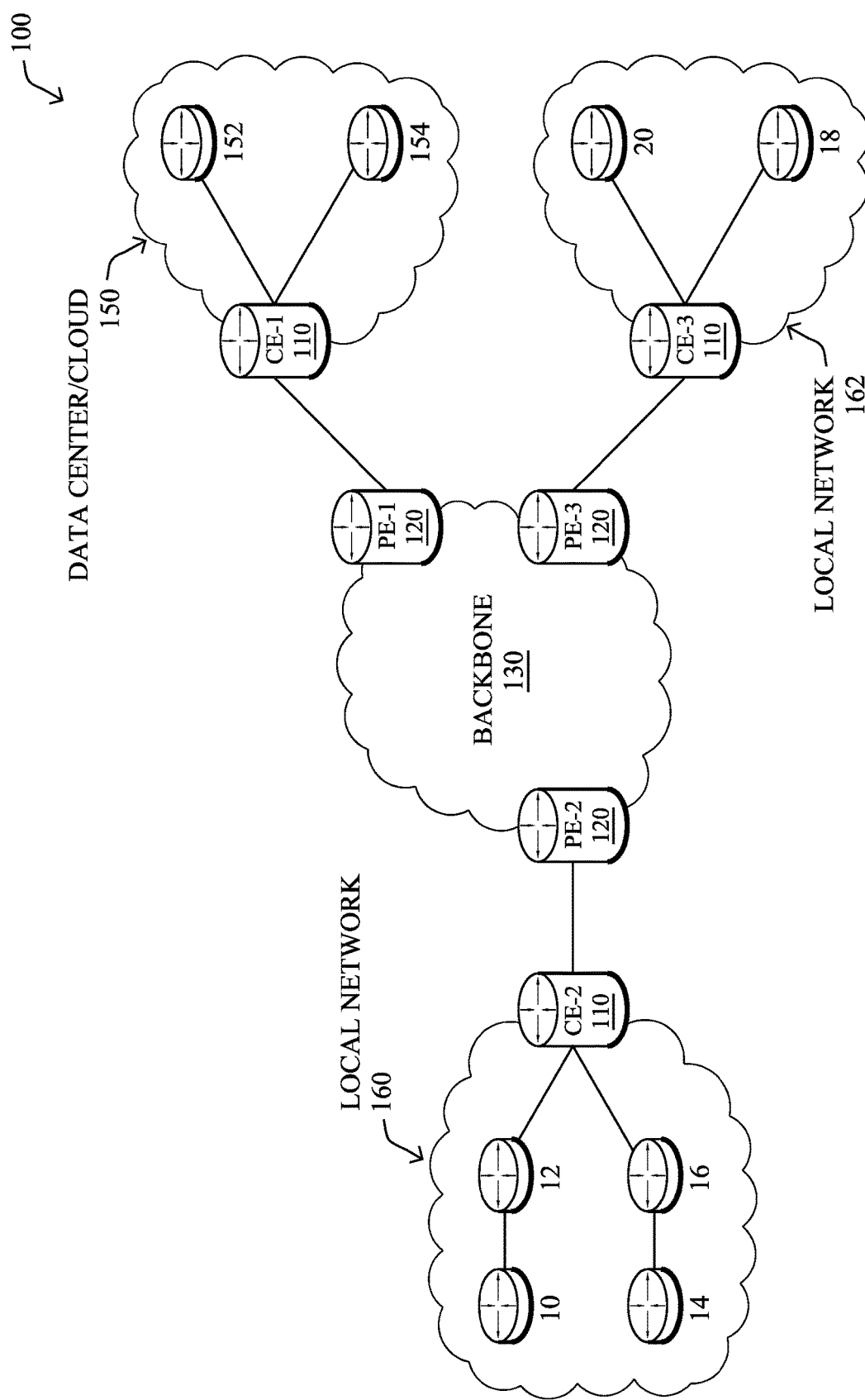

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.).

The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
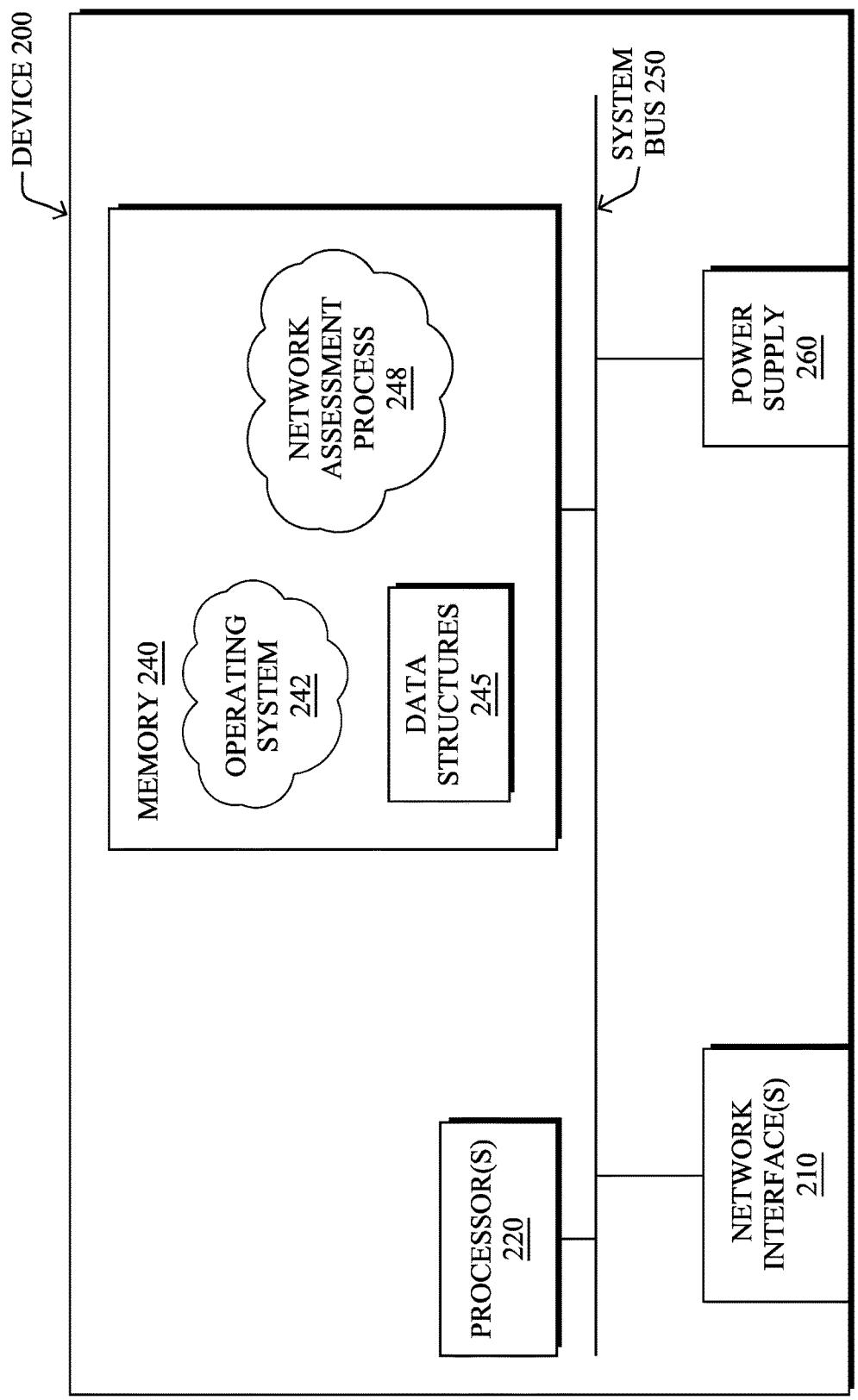
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assessment process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assessment process 248 includes computer executable instructions that, when executed by processor(s) 220, cause device 200 to assess the health/state of any number of networks. In various embodiments, network assessment process 248 may ingest captured telemetry data from the network(s) to determine whether a problem exists, or will exist, within the source network. If so, network assessment process 248 may initiate corrective measures such as rerouting traffic, changing network entity configurations, raising alerts, and the like.

In some embodiments, network assessment process 248 may utilize machine learning techniques, to perform its assessment of the network(s). In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assessment process 248 may employ one or more supervised, unsupervised, or semi-supervised machine learning models. Generally, supervised learning entails the use of a training set of data, as noted above, that is used to train the model to apply labels to the input data. For example, the training data may include samples of 'good' operations and 'bad' operations and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior, as in the case of unsupervised anomaly detection. Semi-supervised learning models take a middle ground approach that uses a greatly reduced set of labeled training data.

Example machine learning techniques that network assessment process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, deep learning models, or the like.

The performance of a machine learning model can be evaluated in a number of ways based on the number of true positives, false positives, true negatives, and/or false negatives of the model. For example, consider the case of a machine learning model that predicts whether a network tunnel is likely to fail. In such a case, the false positives of the model may refer to the number of times the model incorrectly predicted that the tunnel would fail. Conversely, the false negatives of the model may refer to the number of times the model incorrectly predicted that the tunnel would not fail. True negatives and positives may refer to the number of times the model correctly predicted whether the tunnel would operate as expected or is likely to fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, machine learning can be used to assess the operations of a computer network to detect problems, predict behavioral changes or future problems, and initiate corrective measures, automatically and/or with the involvement of a network expert. For example, such systems can be used for purposes of providing network assurance to a wired or wireless network, a software defined wide area network (SD-WAN), evaluating the behaviors of client devices (e.g., for purposes of device type identification, network security, etc.), or the like.

Unfortunately, machine learning systems typically require the collection and reporting of a large amount of time series data. In cloud-based implementations, this means transmitting large amount of time series data from the networking devices/entities to the cloud for input to the machine learning model(s), to drive downstream actions such as predicting SLAs, alerting, etc. Since a large number of devices transmit this data at a very high frequency, the amount of telemetry data can quickly overwhelm the network by consuming valuable network resources.

Compressed Transmission of Network Data for Networking Machine Learning Systems

The techniques herein introduce time series compression mechanisms that help to reduce the network load when reporting data from a networking device to a remote (e.g., cloud-based) machine learning service. In some aspects and in contrast to traditional compression schemes, the compression introduced herein is tuned such that maximal information is delivered to the machine learning models for purposes of prediction, anomaly detection, and the like. In further aspects, the techniques herein can also dynamically determine the level of compression based on network conditions (e.g., available bandwidth, etc.), allowing the edge networking devices to devices to transmit appropriately compressed messages to the cloud.

Specifically, according to one or more embodiments of the disclosure as described in detail below, a service receives telemetry data indicative of a plurality of performance metrics captured in a network. The service jointly trains, using the received telemetry data, a compression model and an inference model, the compression model being a first machine learning model trained to convert the telemetry data into a compressed representation of the telemetry data and the inference model being a second machine learning model trained to take the compressed representation of the telemetry data as input and apply a classification label to it. The service deploys the compression model to the network. The service receives compressed telemetry data generated by the compression model deployed to the network. The service uses the inference model to classify the compressed telemetry data generated by the compression model deployed to the network.

Illustratively, the techniques described herein may be performed by hardware, software, and/or firmware, such as in accordance with the network assessment process 248, or another process, which may include computer executable instructions executed by the processor 220 (or independent processor of interfaces 210) to perform functions relating to the techniques described herein.

Figure 3:
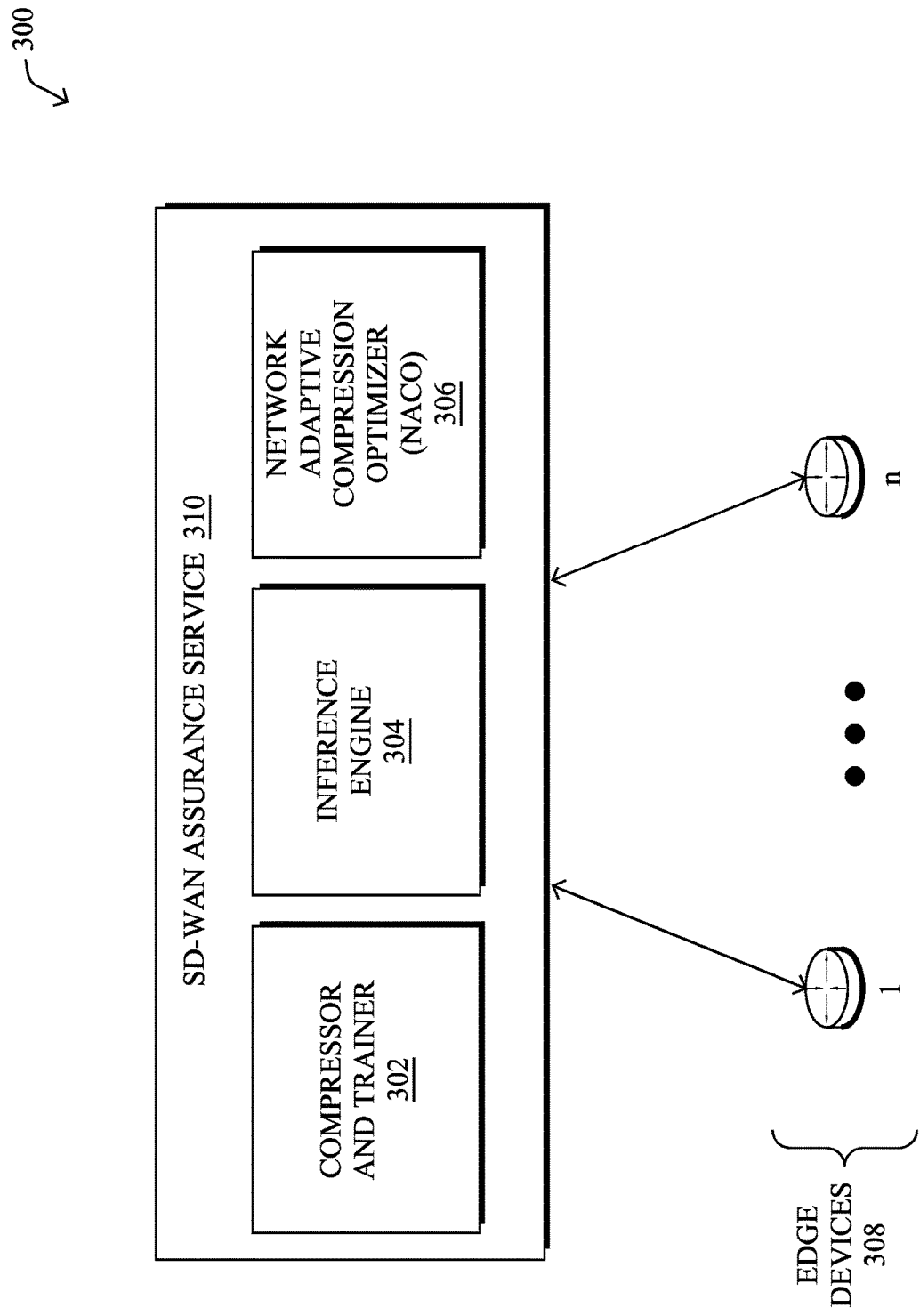
FIG. 3 illustrates an example architecture for predicting tunnel failures in a software-defined wide area network (SD-WAN)

Operationally, FIG. 3 illustrates an example architecture 300 for predicting tunnel failures in a network, such as a software-defined WAN (SD-WAN), according to various embodiments. For illustrative purposes, the techniques herein are show with respect to assessing and controlling the operation of an SD-WAN. However, the techniques herein are not limited as such and can be applied to any system that relies on a remote service (e.g., cloud-based) that uses machine learning to assess the operations of a computer network.

At the core of architecture 300 is SD-WAN assurance service 310 that is responsible for overseeing the operations of edge devices 308 via which tunnels are formed in the SD-WAN. As shown, SD-WAN assurance service 310 may include the following components: a telemetry collection module 302, a compressor and trainer 302, an inference engine 304, and/or a network adaptive compression optimizer (NACO) 306. These components 302-306 may be implemented in a distributed manner or implemented as their own stand-alone services, either as part of the network under observation or as a remote service. In addition, the functionalities of the components of architecture 300 may be combined, omitted, or implemented as part of other processes, as desired.

SD-WAN assurance service 310 may be in communication with any number of edge devices 308 (e.g., a first through $n^{th}$ device), such as CE routers 110, described previously. In various embodiments, edge devices 308 may be part of the same SD-WAN or, in cases in which 310 is implemented as a cloud-based service, part of any number of different SD-WANs.

In general, there are many circumstances in a network that can lead to tunnel failures in various areas of the network between a head-end and tail-end router (e.g., between routers 110, etc.). An objective of SD-WAN assurance service 310, as detailed below, is to learn early signs (networking behavioral) that have some predictive power, allowing the model(s) of inference engine 306 to predict/forecast a tunnel failure. It is expected that some failures are predictable (i.e., there exist early signs of an upcoming failure) while others will not be non-predictable (e.g., fiber cut, router crash, etc.). More specifically, almost all failures exhibit early signs, but those signs may appear only a few milliseconds (or even nanoseconds), prior to the failure (e.g. fiber cut), thereby making forecasting an almost impossible task. Some non-predictable failures may be due to the absence of signaling back to the edge device 308 involved and may be localized to the core of the service provider network (e.g., the underlying IP, 4G, 5G, etc.), in which case the failure is non-predicable from the perspective of the edge device 308.

A key function of inference engine 304 is to make inferences about the SD-WAN based on telemetry data collected and reported by edge devices 308. For example, such telemetry data may include any or all of the following performance metric data: memory utilization, CPU/processor utilization, Bidirectional Forwarding Detection (BFD) probe statics (e.g., latency, loss, jitter), queue statistics (e.g., percentage drops for different queues, etc.), interface down events, re-key exchange failures, router crash log data, combinations thereof, or the like.

In various embodiments, compressor and trainer 302 may operate in conjunction with inference engine 304, to control the compression of the telemetry data consumed by inference engine 304 and to train the machine learning model(s) of inference engine 304. To do so, compressor and trainer 302 may operate in two phases: 1.) a cold-start phase and 2.) a normal phase.

During the cold-start phase, compressor and trainer 302 may receive the raw time series of all telemetry data features (e.g., CPU usage, number of control connection downs, etc.). In turn, compressor and trainer 302 may use machine learning to jointly 1.) compress the time-series of raw multivariate features into a compressed lower-dimension space and 2.) train the model using the lower-dimension input for achieving a machine learning task. In the context of SD-WAN tunnels, this prediction may predict one or more SLA metrics, such as loss, latency, or the like.

Figure 4:
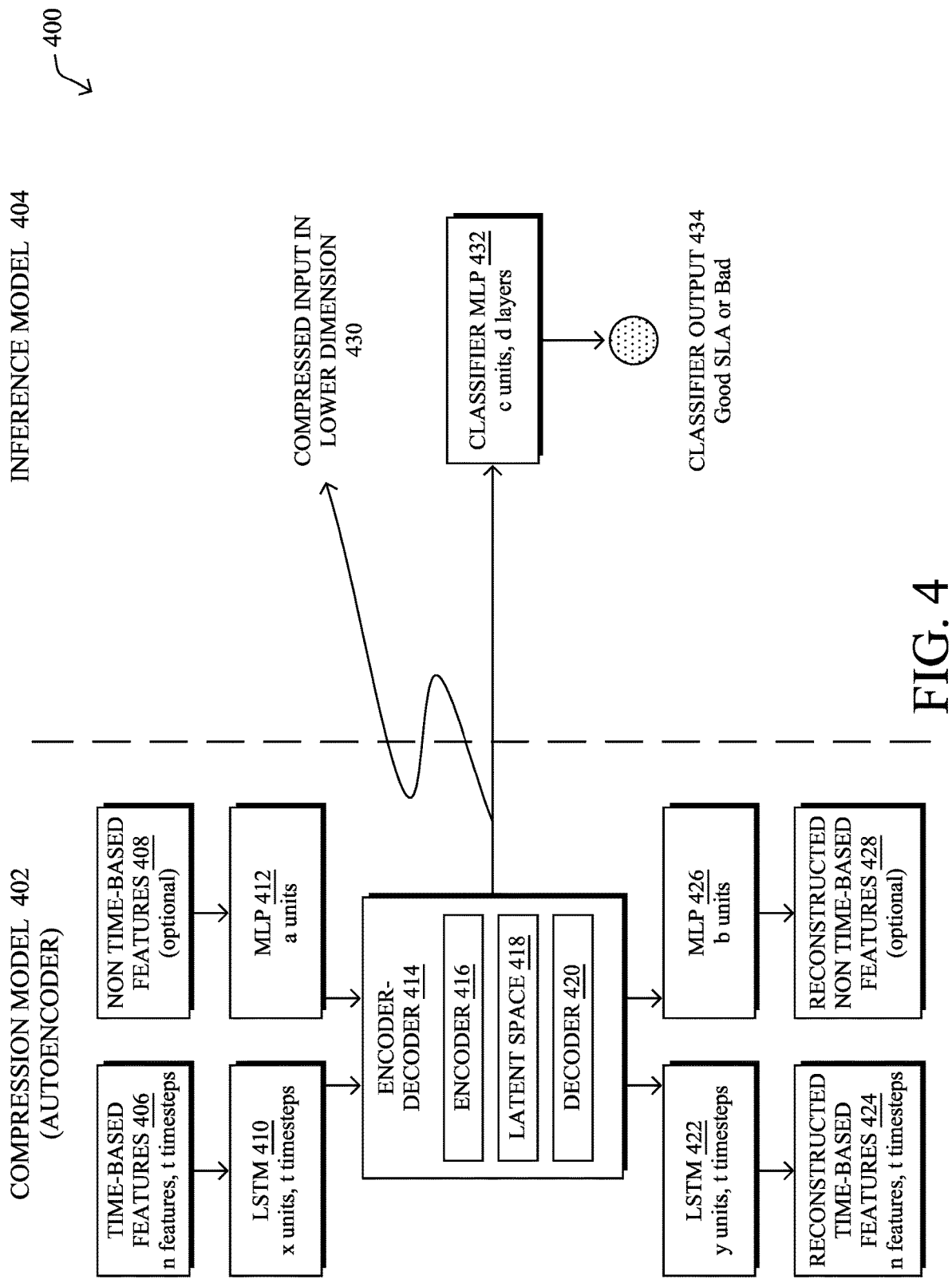
FIG. 4 illustrates an example architecture to compress telemetry data and classify the compressed telemetry data.

In one embodiment, neural network with autoencoders and dense networks can be trained jointly for purposes of data compression and achieving a machine learning task (e.g., SLA prediction, etc.). FIG. 4 illustrates an example architecture 400 to compress telemetry data and classify the compressed telemetry data, in some embodiments.

As shown in FIG. 4, the first part of architecture 400 is a compression model 402, which is an autoencoder that takes as input both time-based features 406 and, optionally, non-time-based features 408, in various embodiments. In general, time-based features 406 may comprise timeseries data for n-number of telemetry data features over t-number of timesteps.

In turn, compression model 402 may compress features 406-408 into a lower dimension space. For example, at the core of compression model 402 may be an autoencoder comprising an encoder-decoder 414 that includes an encoder 416, a latent space 418, and a decoder 420. In the case of time-based features 406, inputting features 406 into a long short-term memory (LSTM) 410 that processes x-number of units across t-number of timesteps, followed by encoder-decoder 414, and then another LSTM 422 that processes y-number of units across t-number of timesteps, will result in reconstructed time-based features 424. Similarly, the optional, non-time-based features 408 may be input to a multi-layer perceptron (MLP) layer 412 that processes a-number of units, followed by encoder-decoder 414, and then another MLP layer 426 that processes b-number of units and reconstructs features 408 into reconstructed non-time-based features 428.

As would be appreciated, an autoencoder is a form of unsupervised artificial neural network (ANN) that is able to learn a representation, also called an encoding, of a dataset, that is then used to reconstruct the input. This representation is of lower dimensionality and compressed, with respect to the original input data. Thus, encoder 416 of encoder-decoder 414 will compress features 406-408 into latent space 418, which is of lower dimensionality than their original form.

In various embodiments, the compressed data 430 within latent space 418 may then be used as input to an inference model 404, which may take the form of a classifier, regressor, or the like, and executed as part of inference engine 304 shown in FIG. 3. For example, inference model 404 may comprise a classifier MLP 432 (e.g., a classifier that processes c-number of units across d-number of layers) and outputs a classifier output 434, given the compressed data 430 from compression model 402 as input. Such a classifier output 434 may take the form of a label associated with the compressed data 430, such as labeling the SLA as 'Good' or 'Bad.'

Both compression model 402 and the inference model 404 may be trained jointly such that the system learns the best representation of the time series and other inputs. For example, in the case of artificial neural networks, the joint training can be easily performed by means of back-propagation techniques. The entirety of such a process may be performed by service 310 by having the edge devices 308 relay the raw time series data to it for analysis. in the cloud relaying on the raw time-series.

Figure 5A:
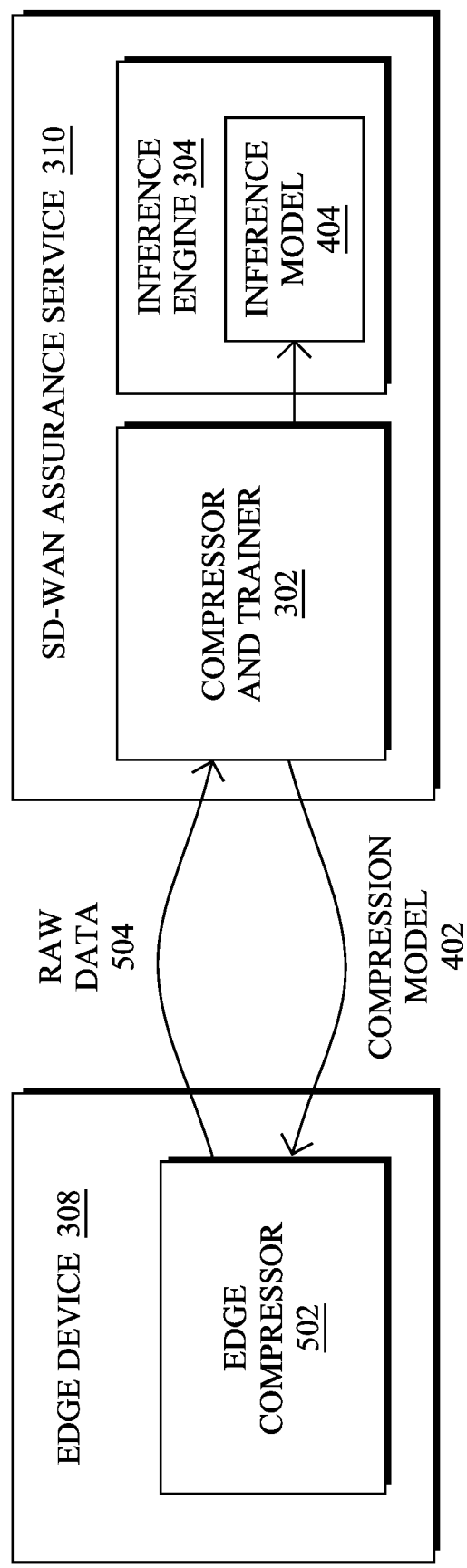
FIGS. 5A-5D illustrate examples of using a machine learning model to compress telemetry data for inference/classification.

FIG. 5A illustrates an example of the interaction between an edge device 308 and SD-WAN assurance service 310, in various embodiments. During the cold-start phase of compressor and trainer 302, edge device 308 may send the raw telemetry/KPI data 504 that it captures to compressor and trainer 302. For example, data 504 may include time series data for any number of measured KPIs and/or other non-time series data indicative of the operational state of the network. In turn, compressor and trainer 302 may use the approach detailed above to jointly train compression model 402 and inference model 404.

As shown, compressor and trainer 302 may deploy the trained inference model 404 to inference engine 304 to make inferences about the network(s) undergoing monitoring and assessment by SD-WAN assurance service 310. In addition, in various embodiments, compressor and trainer 302 may deploy compression model 402 to an edge compressor 502 executed by edge device 308. At this point, compression model 402 has been trained to compress raw data 504 into a lower-dimensional signal and inference model 404 has been trained to make inferences about that compressed data. Compressor and trainer 302 may then move to its normal phase of operation.

Figure 5B:
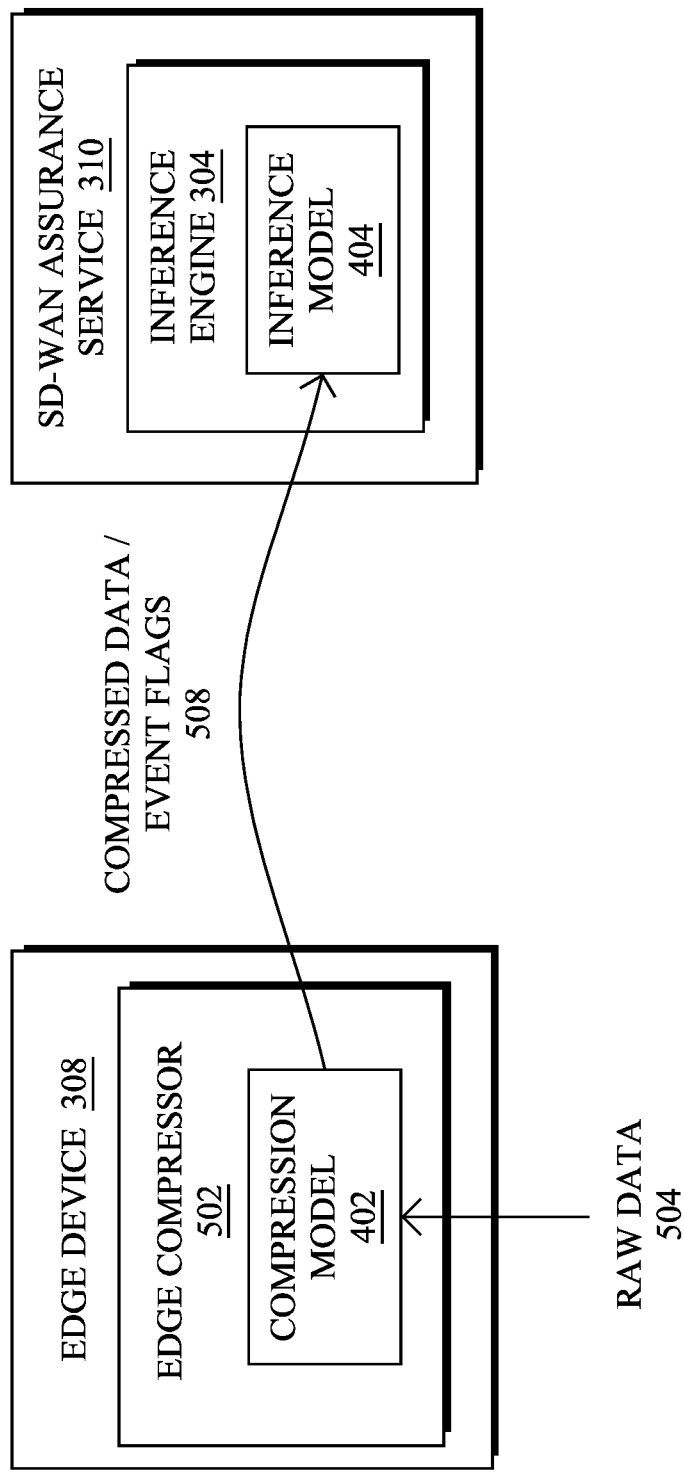

FIG. 5B illustrates the operation of models 402-404, once deployed, according to various embodiments. During execution by edge device 308, edge compressor 502 may keep track of the raw data 504 captured by edge device 308. In turn, edge compressor 502 may use the deployed compression model 402 to form compressed data and event flags 508, which it then sends to SD-WAN assurance service 310. Since inference model 404 was jointly trained with compression model 402, inference engine 304 may use the receive compressed data and event flags 508 as input to inference model 404, to make inferences about the network of edge device 308. By sending the lower-dimensionality data to SD-WAN assurance service 310 instead of the raw data, the overhead incurred by the reporting can be significantly reduced, while still guaranteeing a certain degree of performance by inference engine 304.

Figure 5C:
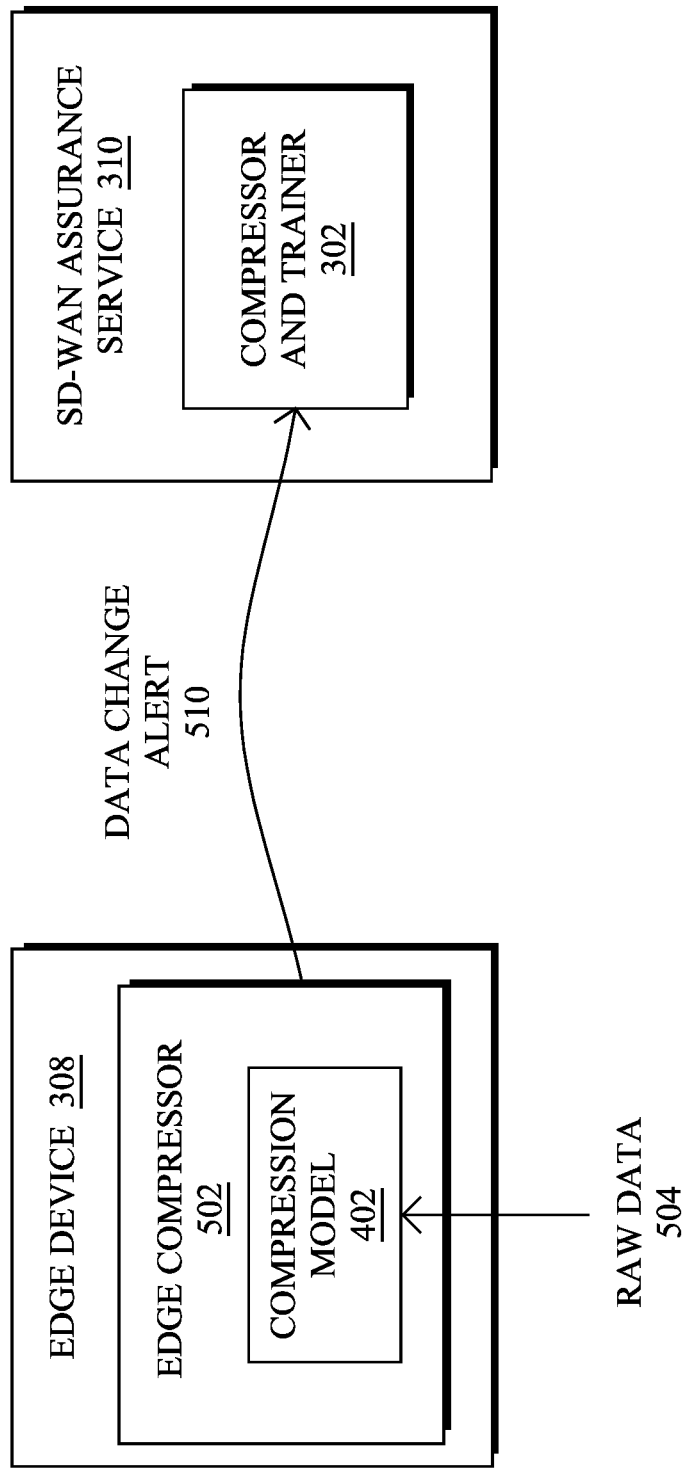

In one embodiment, as shown in FIG. 5C, edge compressor 502 of edge device 308 may also monitor the data pattern of raw data 504 and send a data change alert 510 to compressor and trainer 302, when the distribution of data 504 changes by a threshold amount. In response, compressor and trainer 302 may revert to its cold start phase and retrain models 402-404.

Detection of the distribution change in raw data 504 by edge compressor 502 can be achieved in a number of ways. In one embodiment, the edge compressor 502 may monitor the distribution of the input features in raw data 504 over a given time-window (e.g., 1 day, etc.). If the distribution changes significantly, as determined using the Kolmogorov-Smirnov test, Wasserstein distance, Cramer Von Mises criterion, or the like, then edge compressor 502 may send alert 510 to compressor and trainer 302 in the cloud declaring a significant change in the data. In another embodiment, edge compressor 502 may measure the loss at the encoder-decoder of compression model 402 for each input row that is used by inference model 404 to make predictions. When the aggregate loss for a period of time (e.g., a week or more, etc.) is greater than a given threshold, edge compressor 502 may raise a data change alert 510.

Figure 5D:
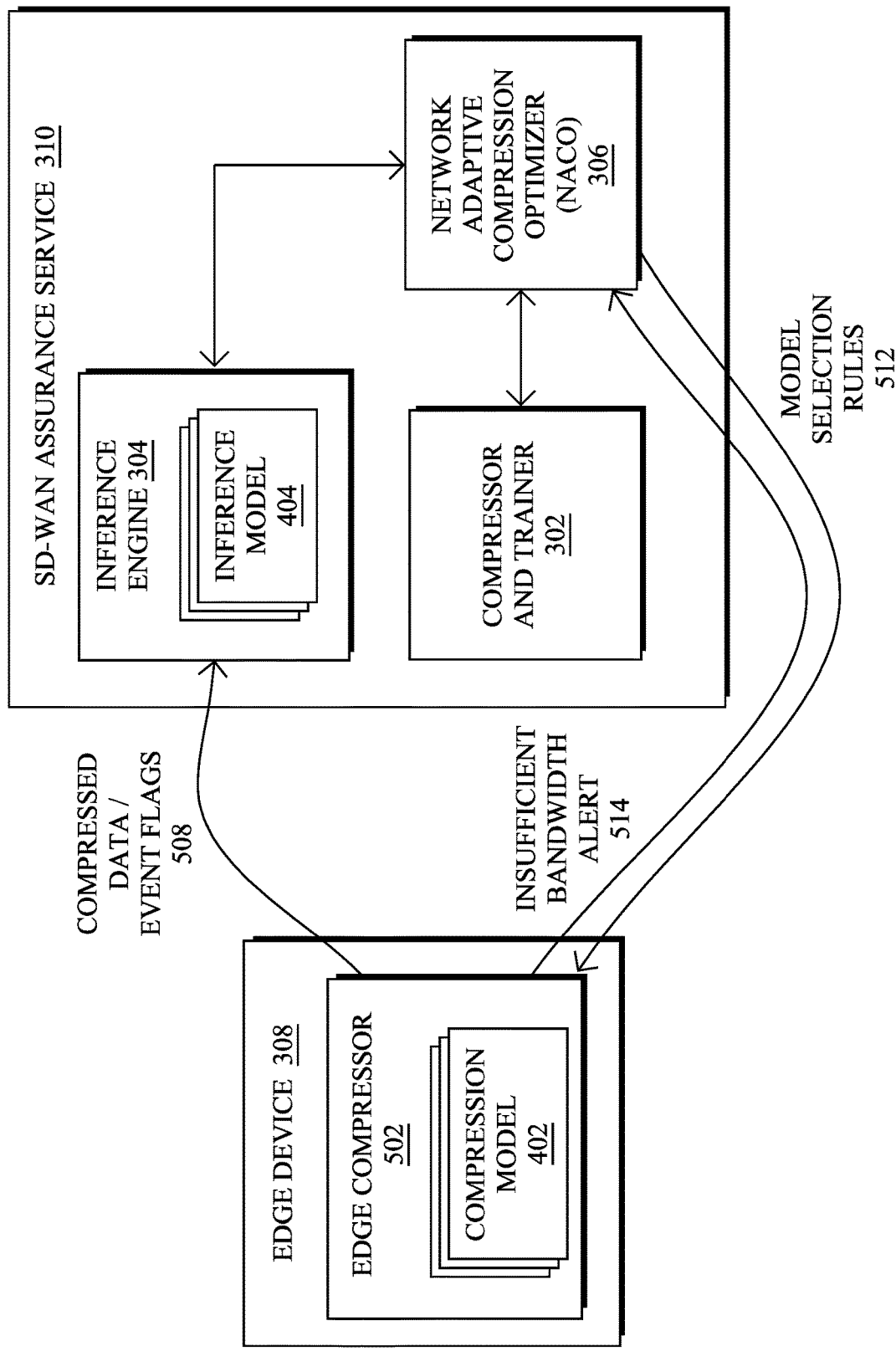

Referring now to FIG. 5D, another potential component of SD-WAN assurance service 310 is network adaptive compression optimizer (NACO) 306. In various embodiments, NACO 306 is responsible for dynamically enforcing a closed loop control to optimize the accuracy of the inference model, given any resource constraints on the data reporting by edge device 308 to SD-WAN assurance service 310 (e.g., in terms of bandwidth, etc.). In one embodiment, NACO 306 sends a message to compressor and trainer 302 to train multiple models that have different compression-levels. For example, compressor and trainer 302 can train multiple auto-encoder models [M1, M2, M3, . . . ] with different dimensionalities to the compressed output, where the number of dimensions in M1>M2, M2>M3, and so on. As would be appreciated, the smaller the number of dimensions in the compressed output, the greater the compression.

Note that a tradeoff between performance and compression may be made by the system. More particularly, the compression approach introduced herein is, to a certain extent, lossy. This means that the higher the degree of compression, the lower the performance of the inference model, as more information is lost. Thus, it is generally expected that the performance of M1>performance of M2, and so on. In one embodiment, NACO 306 may adjust the dimensionality of the compression during each training cycle of compressor and trainer 302, to create a pool of compression and inference models. Compressor and trainer 302 can then deploy the compression models to the edge devices and inference models to inference engine 304, as described previously.

The inference engine 304 of service 310 will also know the type of compression/compression model 402 (M1, M2, etc.) that was used by edge compressor 502 to compress the data 508 that it receives as input. In turn, inference engine 304 may select the corresponding inference model 404 that uses a dimensionality that is compatible with that of the received input data. Inference engine 304 can also send frequent feedback to NACO 306 on the performance of the inference model 404 used. Such information is useful to maintain the performance vs compression trade-off equilibrium.

In some embodiments, NACO 306 may also provide guidelines to the edge devices so that they can choose which compression model to use, given the performance vs. compression tradeoff. In one embodiment, NACO 306 might send simple rules on which model to use for a given timeframe. For example, as shown, NACO 306 may send model selection rules 312 to edge compressor 502, to select which compression model 402 should be used in a given timeframe. In this case, NACO 306 might examine the usage of network bandwidth over a given time-period and decide to utilize different models 402 at different times-of-the-day/days-of-the-week. For example, NACO 306 might determine that edge compressor 502 should use model M1 (e.g., less aggressive compression) during most crucial, but less congested, times of the day. However, NACO 306 may determine that edge compressor 502 should switch to model M2 (more aggressive compression) on weekends and nights, times at which it is generally expected a lower congestion.

In another embodiment, edge compressor 502 may also have the ability to dynamically switch between compression levels/models 402 based on the bandwidth locally available, queue states, etc.

More complex scheduling of models 402 with different compression factors can also be employed, in other embodiments. This provides guidelines to the edge devices on what sort of compressed data (encoder models) to use at different times.

In a further embodiment, NACO 306 may instruct each networking device 308 individually on which compression model 402 to use. In this case, the edge device 308 may include a "compression-level" indicator in the compressed data that it reports to SD-WAN assurance service 310 (e.g., whether edge compressor 502 used model M1, M2, etc.). In other words, in some cases, the compressed data may also include an identifier for the compression model used to generate the compressed data so that the appropriate inference model can be selected to analyze the compressed data. For example, edge device 308 may initially send uncompressed data to service 310 and switch to using model M2 (with higher compression), if it determines that network resources are getting scarce.

In yet another embodiment, edge device 308 might sense that all the existing models 402 are overshooting the required network bandwidth. In such a case, it may send an "insufficient bandwidth" notification back to NACO 306, which will then cause compressor and trainer 302 to train further models that use even greater compression/less dimensionality. For example, if edge device 308 determines that none of its current compression models 402 satisfy its bandwidth constraints, it may send insufficient bandwidth alert 514 to NACO 306, to request that compressor and trainer 302 train models with even greater compression.

In a further embodiment, edge device 308 could evaluate an affordable "budget" that is allotted for the data messages (for all time-series). For example, edge device 308 might allocate X Mbps for sending all the data to SD-WAN assurance service 310. Based on this, NACO 306 could then compute the maximum compression ratio for purposes of model training by compressor and trainer 302.

Thus, in some cases, different edge devices 308 may use different levels of data compression, when reporting data to SD-WAN assurance service 310. Depending on their bandwidth or other resource constraints, they may use different compression models 402 to send the compressed telemetry data to service 310. The system thus becomes dynamic with edge devices 308 having different compressors.

Figure 6A:
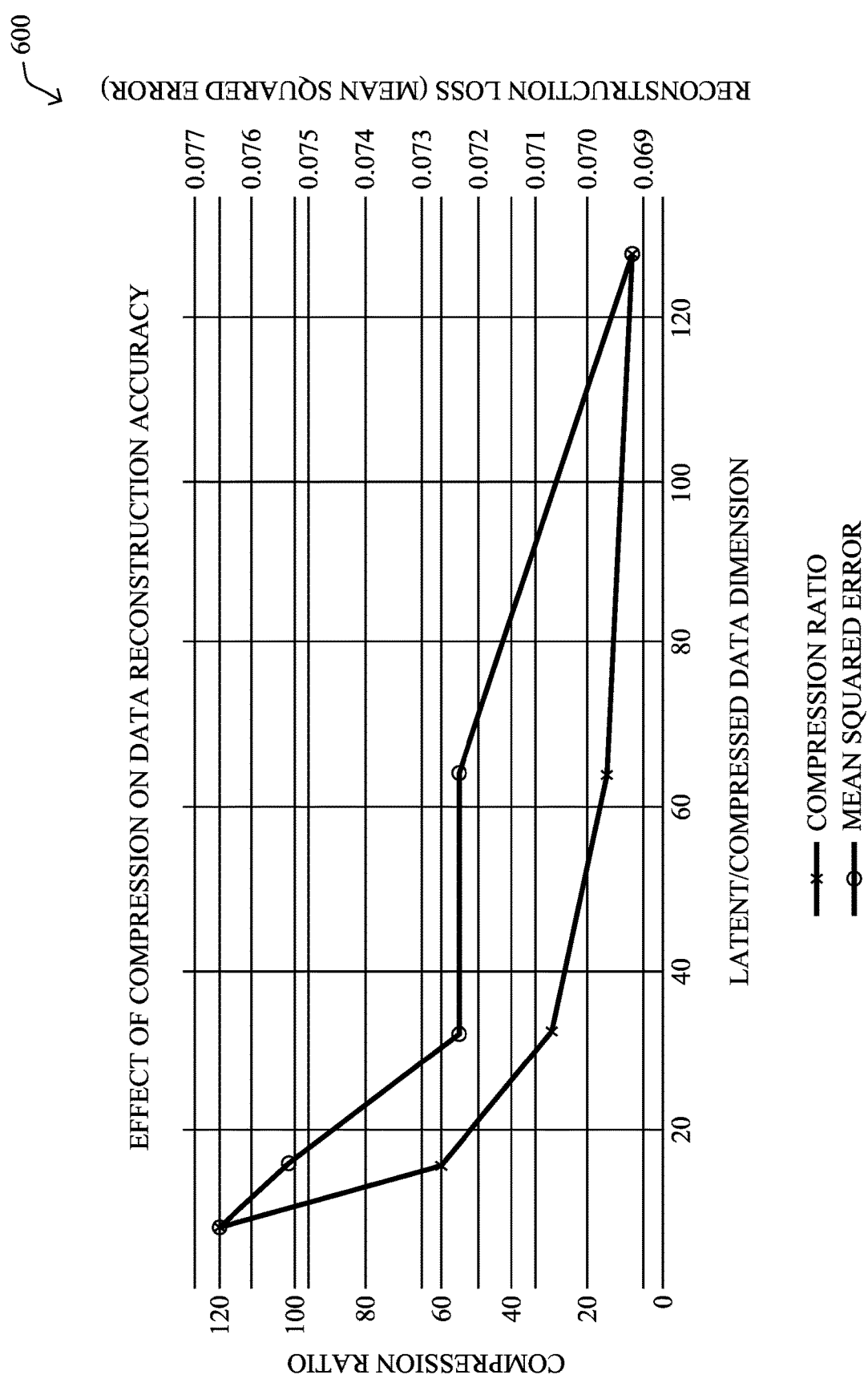
FIGS. 6A-6B illustrate example plots of the effects of telemetry data compression on reconstruction accuracy.
Figure 6B:
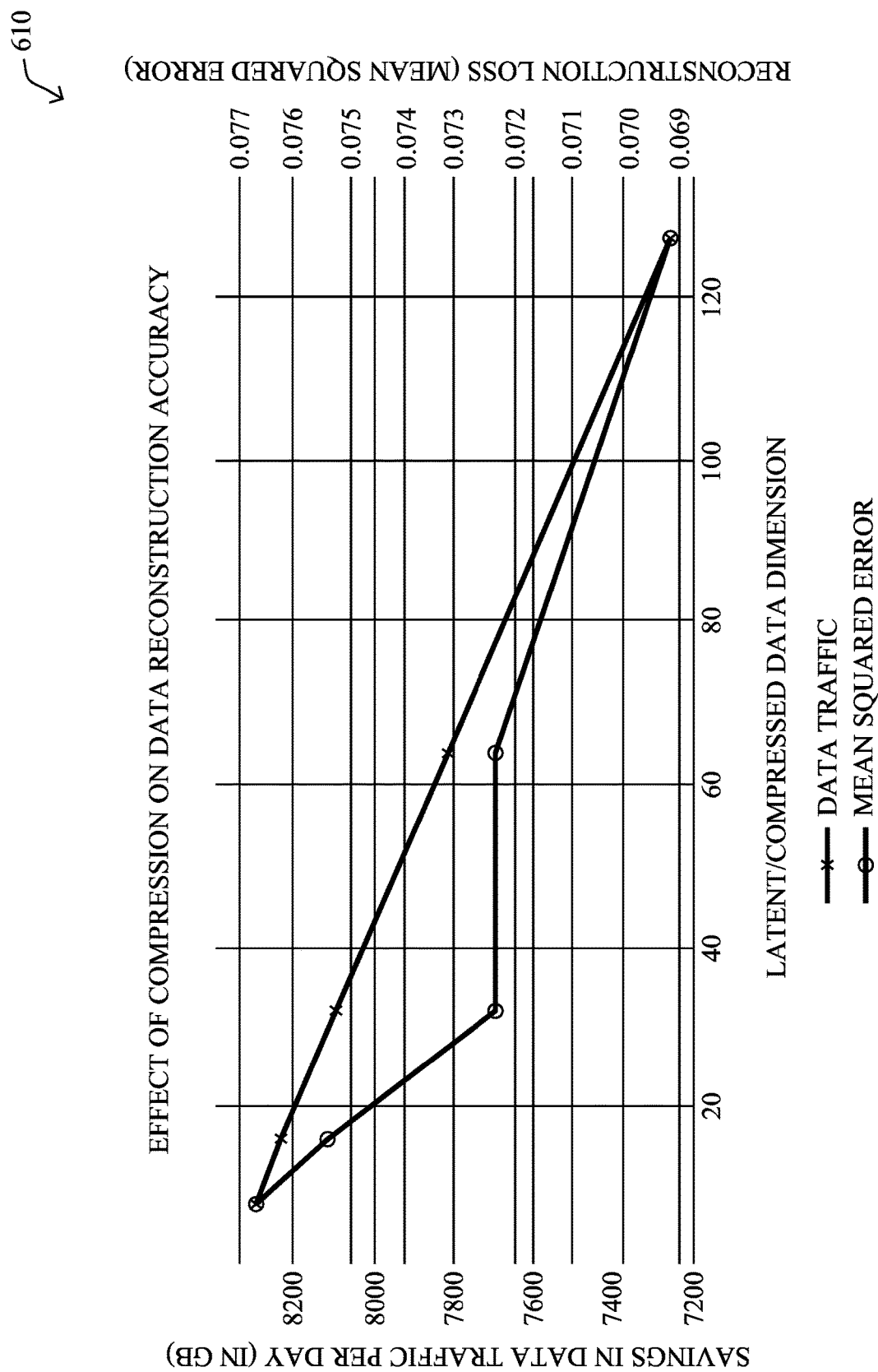

FIGS. 6A-6B illustrate example plots 600 and 610, respectively, using data captured from an SD-WAN with approximately 4,500 tunnels per day. Plot 600 in FIG. 6A demonstrates the effect of data compression on data reconstruction accuracy. The data savings shown in plot 610 in FIG. 6B was calculated for all the data that would be transmitted for a particular classification task. A single instance of the raw data had a dimensionality of 970.

The following terms are used herein:
Compression Ratio—Uncompressed Data size/Compressed Data size
Data Savings per Day—Data Traffic before Compression—Data Traffic after Compression In plot 600 in FIG. 6A, the x-axis shows the compressed data dimension, i.e., the number of bytes used to send the compressed time-series data to the cloud. There are two lines of interest here:
Compression Ratio—This is shown on the left y-axis and measures the ratio of uncompressed size to the compressed size. For example, using 32 doubles in latent size (compressed data dimension) will allow compression of 1:120. As the latent dimension is increased the compression ratio decreases. For example, at 128 bytes of latent size, the compression ratio is 1:10.

Reconstruction loss—This is shown in the right y-axis and is a proxy for measuring how much of information is lost while compressing. In other words, the larger the reconstruction loss, the lower the accuracy of the model. It is measured by using the Mean Square Error metric.

As can be seen, the compression ratio decreases with the increase in compressed data dimensions. However, it can also be observed that with this decrease there is a decrease in reconstruction loss, i.e. an increase in model performance. This establishes that there is a tradeoff between model performance and data compression that can be made.

The amount of data traffic saved because of compression can be better understood via the example plot 610 in FIG. 6B. In plot 610, the x-axis represents the dimension of the latent space/compressed data. The left y-axis represents the amount of data saved per day in Gigabytes. Finally, the right y-axis represents the Mean Squared Error between the raw data and the data reconstructed from the compressed data, which roughly represents the amount of information loss.

Noticeably, as the compressed data dimensionality is increased, the particular savings in data traffic is also decreased. This is accompanied with an increase in model performance, as denoted by the drop in the amount of error. It is, however, interesting to see that even the lowest savings in data, the amount of data transmitted is still 7.2 TBs per day, which is not insignificant.

Figure 7:
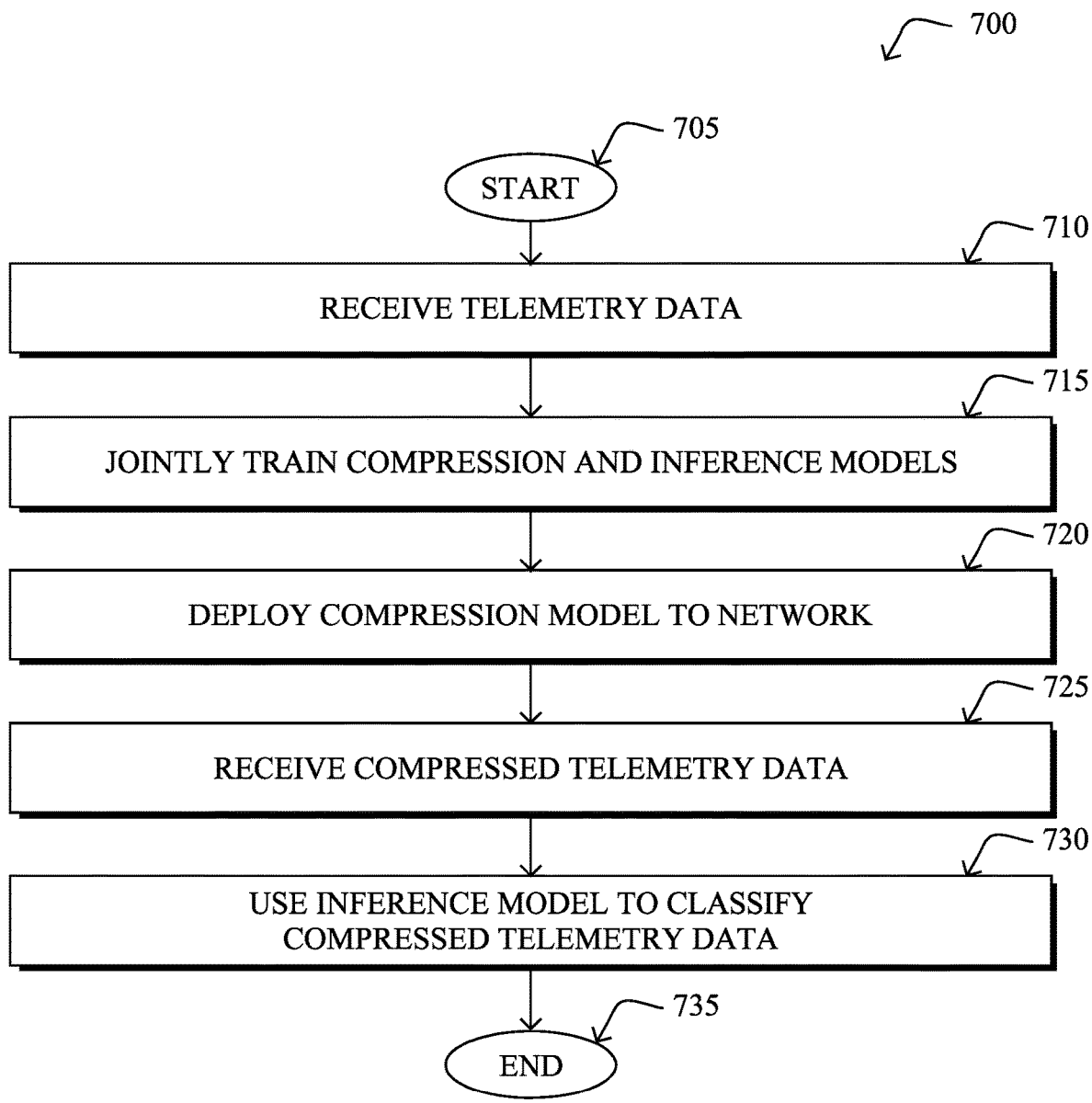
FIG. 7 illustrates an example simplified procedure for compressing telemetry data for machine learning inference/classification.

FIG. 7 illustrates an example simplified procedure 700 for compressing telemetry data for machine learning inference/classification, in accordance with one or more embodiments described herein. For example, a non-generic, specifically configured device may perform procedure 700 by executing stored instructions, to provide a service to one or more networks. The procedure 700 may start at step 705, and continues to step 710, where, as described in greater detail above, the service may receive telemetry data indicative of a plurality of performance metrics captured in a network. In various embodiments, the plurality of performance metrics may comprise one or more of: memory utilization, processor utilization, Bidirectional Forwarding Detection (BFD) probe statics, queue statistics, interface down events, re-key exchange failures, or router crash log data. For example, the service may receive timeseries data for the memory utilization of a particular router, the CPU/processor utilization of the router, etc., and data regarding any events that have occurred over time.

At step 715, as detailed above, the service may jointly train, using the received telemetry data, a compression model and an inference model. In various embodiments, the compression model is a first machine learning model trained to convert the telemetry data. For example, the compression model may be an autoencoder-based model that compresses the telemetry data into a compressed form of lower dimensionality. In further embodiments, the inference model may be a second machine learning model trained to take the compressed representation of the telemetry data as input and apply a classification label to it. As would be appreciated, this pair of models will exhibit a certain degree of telemetry data compression and inference accuracy, depending on the training.

At step 720, the service may deploy the compression model to the network, as described in greater detail above. For example, the service may send the trained compression model to a router or other telemetry exporter for use. In some embodiments, the service may jointly train pairs of compression and inference models, each pair exhibiting a different degree of data compression and inference accuracy, and deploy a plurality of compression models to the device for use. Doing so allows the device to select from among the compression models to use, depending on the current conditions of the network, such as the available bandwidth (e.g., by selecting a compression model with greater compression when there is less bandwidth available, etc.).

At step 725, as detailed above, the service may receive compressed telemetry data generated by the compression model deployed to the network. In some cases, such as when multiple compression models are deployed to the network, the compressed telemetry data may also include an identifier for the compression model used to generate the compressed telemetry data.

At step 730, the service may use the inference model to classify the compressed telemetry data generated by the compression model deployed to the network, as described in greater detail above. For example, the service may use the inference model to label the compressed telemetry data with a classification label that indicates whether the network will satisfy a particular SLA associated with traffic in the network. In another, more specific case, the classification label may indicate whether a particular entity in the network (e.g., a networking device, a tunnel, etc.) is likely to fail. In turn, the service may initiate any number of corrective or mitigation measures, such as rerouting traffic in the network or the like. Procedure 700 then ends at step 735.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a compression mechanism that, for a given compression ratio, provides maximum information for machine learning-based inference using a second, machine learning-based compression model. In further aspects, the techniques herein allow for the system to dynamically learn when to send raw data and when to switch to sending compressed data and/or switch between different compression levels/models. In further aspects, the techniques allow for a tradeoff to be made between the degree of compression vs. the information gain by adjusting the compression level depending on the information loss.

While there have been shown and described illustrative embodiments that provide for the compression of network telemetry data for analysis, it is to be understood that various other adaptations and modifications may be made within the spirit and scope of the embodiments herein. For example, while certain embodiments are described herein with respect to using certain models for purposes of forecasting and making inferences about the network, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a cloud-based service, telemetry data indicative of a plurality of performance metrics captured in a network;
jointly training, by the cloud-based service and using the received telemetry data, a compression model and an inference model, wherein the compression model is a first machine learning model trained to convert the telemetry data into a compressed representation of the telemetry data, and wherein the inference model is a second machine learning model trained to take the compressed representation of the telemetry data as input and apply a classification label to it;
deploying, by the cloud-based service, the compression model to the network by sending the compression model trained by the cloud-based service to a device in the network for use at the device;
receiving, at the cloud-based service and from the device in the network, compressed telemetry data generated by the compression model deployed to the network; and
using, by the cloud-based service, the inference model to classify the compressed telemetry data generated by the compression model deployed to the network.

2. The method as in claim 1, wherein using the inference model to classify the compressed telemetry data generated by the compression model comprises:
labeling the compressed telemetry data with a classification label that indicates whether the network will satisfy a particular service level agreement (SLA) associated with traffic in the network.

3. The method as in claim 1, wherein the network is a software-defined wide area network (SD-WAN), and wherein the telemetry data is associated with one or more tunnels in the SD-WAN.

4. The method as in claim 1, wherein the compression model is an autoencoder-based model and the inference model is a classification model.

5. The method as in claim 1, further comprising:
jointly training, by the cloud-based service and based on the received telemetry data, a plurality of pairs of compression and inference models, wherein each pair exhibits a different degree of telemetry data compression and inference accuracy.

6. The method as in claim 5, further comprising:
deploying, by the cloud-based service, the trained compression models to the network, wherein the device in the network selects from among the compression models to generate compressed telemetry data for assessment by the cloud-based service based on an available bandwidth.

7. The method as in claim 1, wherein the compressed telemetry data received at the cloud-based service includes an identifier for the compression model used to generate the compressed telemetry data, and wherein the inference model to classify the compressed telemetry data comprises:
selecting the inference model based on the identifier for the compression model used to generate the compressed telemetry data.

8. The method as in claim 1, further comprising:
receiving, at the cloud-based service, a data change alert indicative of a change in the plurality of performance metrics; and
retraining, by the cloud-based service and jointly, the compression and inference models, based on the received data change alert.

9. The method as in claim 1, wherein the plurality of performance metrics comprises one or more of: memory utilization, processor utilization, Bidirectional Forwarding Detection (BFD) probe statics, queue statistics, interface down events, re-key exchange failures, or router crash log data.

10. An apparatus, comprising:
one or more network interfaces;
a processor coupled to the network interfaces and configured to execute one or more processes; and
a memory configured to store a process executable by the processor, the process when executed configured to:
receive telemetry data indicative of a plurality of performance metrics captured in a network;
jointly train, using the received telemetry data, a compression model and an inference model, wherein the compression model is a first machine learning model trained to convert the telemetry data into a compressed representation of the telemetry data, and wherein the inference model is a second machine learning model trained to take the compressed representation of the telemetry data as input and apply a classification label to it;
deploy the compression model to the network by sending the compression model trained by the apparatus to a device in the network for use at the device;
receive, from the device in the network, compressed telemetry data generated by the compression model deployed to the network; and
use the inference model to classify the compressed telemetry data generated by the compression model deployed to the network.

11. The apparatus as in claim 10, wherein the apparatus uses the inference model to classify the compressed telemetry data generated by the compression model by:
labeling the compressed telemetry data with a classification label that indicates whether the network will satisfy a particular service level agreement (SLA) associated with traffic in the network.

12. The apparatus as in claim 10, wherein the network is a software-defined wide area network (SD-WAN), and wherein the telemetry data is associated with one or more tunnels in the SD-WAN.

13. The apparatus as in claim 10, wherein the compression model is an autoencoder-based model and the inference model is a classification model.

14. The apparatus as in claim 10, wherein the process when executed is further configured to:
jointly train, based on the received telemetry data, a plurality of pairs of compression and inference models, wherein each pair exhibits a different degree of telemetry data compression and inference accuracy.

15. The apparatus as in claim 14, wherein the process when executed is further configured to:
deploy the trained compression models to the network, wherein the device in the network selects from among the compression models to generate compressed telemetry data for assessment by the apparatus based on an available bandwidth.

16. The apparatus as in claim 10, wherein the compressed telemetry data received at the apparatus includes an identifier for the compression model used to generate the compressed telemetry data, and wherein the inference model to classify the compressed telemetry data comprises:

selecting the inference model based on the identifier for the compression model used to generate the compressed telemetry data.

17. The apparatus as in claim 10, wherein the process when executed is further configured to:

receive a data change alert indicative of a change in the plurality of performance metrics; and retrain, jointly, the compression and inference models, based on the received data change alert.

18. The apparatus as in claim 10, wherein the plurality of performance metrics comprises one or more of: memory utilization, processor utilization, Bidirectional Forwarding Detection (BFD) probe statics, queue statistics, interface down events, re-key exchange failures, or router crash log data.

19. A tangible, non-transitory, computer-readable medium storing program instructions that cause a cloud-based service to execute a process comprising:

receiving, at the cloud-based service, telemetry data indicative of a plurality of performance metrics captured in a network;

jointly training, by the cloud-based service and using the received telemetry data, a compression model and an inference model, wherein the compression model is a first machine learning model trained to convert the telemetry data into a compressed representation of the telemetry data, and wherein the inference model is a second machine learning model trained to take the compressed representation of the telemetry data as input and apply a classification label to it;

deploying, by the cloud-based service, the compression model to the network by sending the compression model trained by the cloud-based service to a device in the network for use at the device;

receiving, at the cloud-based service and from the device in the network, compressed telemetry data generated by the compression model deployed to the network; and using, by the cloud-based service, the inference model to classify the compressed telemetry data generated by the compression model deployed to the network.

20. The computer-readable medium as in claim 19, wherein the device in the network that exports the telemetry data to the cloud-based service switches between compressing the telemetry data using the compression model and sending raw telemetry data to the cloud-based service, based on one or more conditions of the network.

* * * * *